United States Patent [19]

Bochinski et al.

[11] 3,707,762

[45] Jan. 2, 1973

[54] METHODS OF USING FLUXES IN JOINING METAL SURFACES

[75] Inventors: Julius H. Bochinski, La Habra; Karl O. Christe, Calabasas; Frank C. Gunderloy, Jr., Santa Susana; Donald Pilipovich, Agoura; Richard D. Wilson, Canoga Park, all of Calif.

[73] Assignee: North American Rockwell Corporation

[22] Filed: Oct. 29, 1970

[21] Appl. No.: 85,308

[52] U.S. Cl. .................. 29/494, 29/495, 117/64, 148/23
[51] Int. Cl. .................. B23k 31/02, B23k 35/38
[58] Field of Search ............ 29/494, 495; 148/22, 23; 117/64

[56] References Cited

UNITED STATES PATENTS

| | | | |
|---|---|---|---|
| 2,612,459 | 9/1952 | Willard et al. | 148/23 |
| 3,071,852 | 1/1963 | Rogers | 29/494 X |
| 3,174,220 | 3/1965 | Durham, Jr. | 148/23 X |
| 3,344,001 | 9/1967 | Thompson | 29/495 X |
| 3,357,093 | 12/1967 | Webb | 29/495 |
| 3,469,304 | 9/1969 | Medsker | 29/495 X |

FOREIGN PATENTS OR APPLICATIONS

| | | | |
|---|---|---|---|
| 560,737 | 7/1958 | Canada | 29/495 |

Primary Examiner—John F. Campbell
Assistant Examiner—Ronald J. Shore
Attorney—H. Fredrick Hamann, L. Lee Humphries, Thomas S. MacDonald and D. Douglas Price

[57] ABSTRACT

A method for joining metal surfaces such as by soft soldering, brazing or solder reflowing is provided wherein a gaseous hydrazine flux is used to remove tarnish films from the metal surfaces to permit the metal surfaces to form a good metallurgical bond.

16 Claims, No Drawings

METHODS OF USING FLUXES IN JOINING METAL SURFACES

BACKGROUND OF THE INVENTION

This invention relates to a method for metallurgically joining metal surfaces. It particularly relates to a method for joining metal surfaces by soft soldering, brazing and solder reflowing.

When metal surfaces are joined by a solder alloy, a metallic continuity is established between the solder alloy and the metal surfaces by the metallurgical bonding of the solder alloy to the metal surfaces. Normally, both the base metal and the fusible solder alloy have a thin film of tarnish on the surface which interferes with the formation of a good metallurgical bond between the base metal and the solder alloy. The tarnish films are formed on the base metal and solder alloy by environmental attack such as by atmospheric oxidation. These tarnish films typically comprise oxides or sulfides, carbonates or other metal salts.

The term "flux," as used in its chemical and metallurgical sense, means a substance or mixture used to promote fusion, especially the fusion of metals or minerals. In the metallurgical joining of metal surfaces with a solder alloy, the flux has several important functions. It acts to displace the atmospheric gas layer on the surface of the base metal and solder alloy and to then remove the tarnish films from the fluxed metals. The flux also acts to permit wetting of the base metal surface by the solder alloy. The flux may have other beneficial effects on the metallurgical bonding process depending on the type of flux and metallic surface employed.

Both organic and inorganic materials have been used as fluxes. The organic fluxes are usually divided into nonrosin base fluxes and rosin base fluxes. Of the nonrosin base fluxes, acids such as stearic acid, halogens such as glutamic hydrochloride and amines such as ethylene diamine are illustrative. The inorganic fluxes include acids such as hydrochloric acid, salts such as zinc chloride and gases such as hydrogen or forming gas.

Various hydrazine compounds have been used as fluxes. Salts of hydrazine, particularly halogen salts, have been used for some time (U. S. Pat. Nos. 2,612,459 and 2,612,460). Hydrazine salt fluxes which are known in the art include hydrazine hydrobromide and hydrazine borate (U. S. Pat. No. 3,344,001). The reaction product of hydrazine and urea prepared in aqueous solution in the substantial absence of other reactive materials and impurities is also reported to function as a flux (U. S. Pat. No. 3,174,220).

Gaseous hydrazine has been used as a fuel in combination with nitrogen trifluoride in the uniting of metal parts by fusion (U. S. Pat. No. 3,071,852). The fusion bonding process is said to be self-fluxing, however, it is reported that the nitrogen trifluoride is the active fluxing agent.

SUMMARY OF THE INVENTION

A method for joining metal surfaces such as by soft soldering, brazing or solder reflowing is provided wherein a gaseous hydrazine flux is used to remove tarnish films from the metal surfaces to permit the metal surfaces to form a good metallurgical bond.

DESCRIPTION OF THE INVENTION

It is an object of the present invention to provide an improved method for joining metal surfaces such as by soft soldering, brazing or solder reflowing by using a gaseous hydrazine flux.

It is a further object to provide a flux for use in metallurgically bonding metal surfaces which avoids the problems inherent in solid, paste and liquid fluxes.

Further objects and advantages will become apparent upon reading the undergoing specification and claims.

According to one aspect of the present invention, a method is provided for metallurgically joining metal surfaces with a solder alloy, such as by soft soldering or brazing, by heating the metal surfaces and the solder alloy in the presence of a gaseous hydrazine flux. The base metal and solder alloy are heated in conventional manner to a temperature above the melting point of the solder alloy but below the melting point of the metal surfaces. The hydrazine flux acts to remove the tarnish films from the fluxed metals. Upon melting, the solder alloy wets the metal surfaces which have been cleaned of tarnish by the hydrazine flux and solidifies and establishes a metallic continuity through the solder joint. While this aspect of the invention will be described in terms of joining two or more metal surfaces with a solder alloy, it should be understood that the invention is equally applicable to metallurgically joining a solder alloy to a single metal surface.

In addition to soft soldering and brazing, the method of the present invention is also applicable to solder reflowing. "Solder reflowing" is generally referred to as the remelting of a solder deposit on a wetted surface. For example, when two pretinned surfaces are reflowed in contact with each other, a good solder joint can result if the tarnish layers on top of the molten solder are removed. Metal parts which have been soldered become tarnished due to environmental attack and the solder joint may loosen due to aging and handling. This solder alloy deposit can be remelted and reflowed in the presence of a gaseous hydrazine flux in accordance with the method of the present invention. The hydrazine flux acts to remove the tarnish layers which have formed on the base metal and the solder alloy deposit. The solder alloy deposit reflows and, on cooling, forms a good metallurgical bond with the base metal thereby reforming the original solder joint. This reflowing operation not only reforms and strengthens the original solder joint but also brightens the base metal.

The hydrazine flux employed herein may be hydrazine ($H_2NNH_2$) or any of the series of mono-, di- or trisubstituted hydrocarbon derivatives of hydrazine of the formula $R_1R_2NNHR_3$ wherein $R_1$, $R_2$ and $R_3$ are each hydrogen aliphatic such as alkyl, cycloaliphatic such as cycloparaffin or aromatic such as phenyl. The preferred class of hydrazine fluxes has the above general formula wherein $R_1$, $R_2$ and $R_3$ are each hydrogen or alkyl of one to five C atoms. The most preferred hydrazine flux is unsubstituted hydrazine ($H_2NNH_2$).

The expression "soldering" as used herein refers to the joining of metal surfaces by means of a lower melting solder alloy and includes soft soldering, brazing and solder reflowing. The expression "solder alloy" as used herein refers to a lower melting alloy whether conventionally denoted as a solder alloy or a brazing alloy. Percentages used herein are by weight unless specified to be by volume.

The temperature at which a flux, or some atomic or molecular species generated thereby, acts to remove the tarnish film from metals, such as by reduction of metal oxide to the corresponding free metal, is referred to as the "temperature of activation." This temperature is unique, as is well known in the art, for every base metal and/or solder alloy. Accordingly, the metal surface/solder alloy joint must not only be heated to a temperature above the melting point of the solder alloy but must also be heated to the temperature of activation of the flux so that the tarnish film on the metals is removed. The temperature of activation for any given base metal/solder alloy combination can easily be determined by heating the solder joint in the presence of the gaseous hydrazine flux until the tarnish film is removed which can be determined by observing the point at which the fluxed metals noticeably brighten indicating that the metal oxides or other tarnish components have been reduced to free metal.

It is generally preferred to conduct the fluxing for soldering applications at a temperature between about 350° and 525° F. However, higher temperatures, for example, in the range of 800° F can be employed if, for example, brazing alloys are used instead of solder alloys. The hydrazine flux should not be heated to a temperature where complete decomposition of the flux to, for example, ammonia and nitrogen occurs before the flux is brought in contact with the workpiece. For soldering applications, the lower temperature range at which the hydrazine flux can be employed is limited only by the necessity for operating above the melting point of the solder alloy, assuming, of course, that the hydrazine flux is at a temperature of activation so that the tarnish films will be removed.

Any conventional solder alloy can be metallurgically bonded to a base metal according to the present invention. It is understood, of course, that the range of the melting point of the solder alloy and the range of the temperature of activation of the hydrazine flux must overlap at a temperature which is below the melting point of the base metal. Examples of common solder alloys which can be employed according to the present invention are soft solders composed of tin and lead and indium solders composed of indium and tin.

Suitable base metals which can be used according to the present invention include both ferrous and non-ferrous metals such as copper, gold, silver and nickel. Since the tarnish film on the base metal is normally a base metal salt or oxide, the base metal must be capable of being reduced by the hydrazine flux at the metallurgical bonding temperature. Copper, gold, silver and nickel are merely illustrative of the conventional base metals whose salts and oxides can be reduced to free metal by the hydrazine flux of the present invention at conventional metallurgical bonding temperatures and, accordingly, any base metal having similar properties can be employed.

Since the hydrazine fluxes used herein are highly reactive at elevated temperatures, they should be handled in non-catalytic containers such as glass or other suitably lined vessels. Additionally, since pure hydrazine vapor, for example, explodes when sparked at 212° F and since an approximately 4.7 percent by volume mixture of hydrazine and air is flammable, it is preferred to carry the hydrazine flux to the workpiece with an inert carrier gas. The carrier gas should be inert toward the hydrazine flux and workpiece and should not interfere with the metallurgical bonding process. Nitrogen and helium are illustrative of the inert carrier gases which can be employed.

The hydrogen flux and inert carrier gas mixture can conveniently be prepared in accordance with one of the following two procedures wherein unsubstituted hydrazine is used as illustrative of the hydrazine flux. According to the first procedure, dry carrier gas is bubbled through pure, liquid hydrazine. The hydrazine is heated to a temperature which will produce a sufficient hydrazine vapor pressure to provide the desired concentration of hydrazine in the inert carrier gas. For example, about a 5 percent by volume hydrazine — 95 percent by volume nitrogen gas stream is produced when nitrogen is bubbled through hydrazine heated to a temperature of about 100° F. In like manner, about an 8 percent by volume hydrazine — 92 percent by volume nitrogen gas stream is produced by heating the hydrazine to a temperature of about 130° F. According to the second procedure, gaseous hydrazine and water is generated from an aqueous hydrazine solution at a rate sufficient to provide the desired hydrazine concentration in the inert carrier gas. It is preferred to use an aqueous hydrazine solution containing less than about 45 percent hydrazine sine these aqueous solutions are not flammable. The aqueous hydrazine solution may conveniently contain, for example, between 35 and 40 percent hydrazine. Regardless of the procedure employed for preparing the hydrazine flux — inert carrier gas mixture, it is generally preferred to use a hydrazine concentration of about a 1 to 10 percent by volume. It is generally preferred to preheat the hydrazine flux - inert carrier gas stream to approximately the metallurgical bonding temperature before passing it over the workpiece in order to obtain an efficient fluxing operation. This preheating step can be accomplished in conventional manner in a non-catalytic preheating zone once the hydrazine flux - inert carrier gas stream is generated by, for example, one of the above procedures.

Since it is usually not possible to determine in advance the exact nature and quantity of the tarnish films, it is generally preferred to use a large excess of hydrazine flux to insure complete removal of all of the tarnish films. The invention may be conveniently practiced by passing the hydrazine flux - inert carrier gas mixture over the workpiece until the surface of the workpiece noticeably brightens indicating that removal of the tarnish films has been affected. The exact dwell time of the gaseous hydrazine flux at the workpiece will, of course, depend on the solder system employed but can be easily regulated since the hydrazine flux is continuously supplied to the workpiece by the inert carrier gas.

The hydrazine flux soldering of the present invention is particularly adapted for use in a printed circuit soldering line. The printed circuit soldering may be conducted in conventional manner except that gaseous hydrazine, for example, is used as the flux in place of the conventional flux such as rosin or hot hydrogen gas. Since the gaseous hydrazine fluxes of the present invention generally exhibit much lower activation temperature than the conventional gaseous fluxes such as hydrogen gas, they are particularly useful in printed circuit soldering and in other applications where the working temperature range is very limited. Since the printed circuit board on which the electrical circuit is printed is typically formed from an epoxy resin, the printed circuit soldering is normally conducted at a temperature below about 525° F in order to avoid melting or damaging the epoxy resin substrate. The workpiece is conveniently heated to about 450° to 525° F; however, the temperature employed is dependent on the specific application of the printed circuit assembly. A 63/ 37 or 60/40 tin-lead solder is normally recommended for the average assembly.

While the invention has been discussed above in terms of its applicability to soft soldering, brazing and solder reflowing, it should be understood that the invention is applicable to any conventional metallurgical bonding process wherein a flux is needed to remove tarnish films from the metal surfaces to permit the metal surfaces to form a good metallurgical bond and wherein the gaseous hydrazine flux of the present invention does not interfere with the metallurgical bonding process. For example, in addition to metallurgical bonding processes in which a lower melting alloy is used to join two or more metal surfaces, the present invention is also usable in solid state diffusion bonding processes in which the formation of a good metallurgical bond is achieved by allowing two or more metal surfaces to diffuse into each other. In solid state diffusion bonding, the metal surfaces are heated and brought into intimate contact by applying pressure. The operating conditions for this type of process strongly depend on the nature of the metals and may require, in some instances, the application of high vacuum in order to remove absorbed gases from the metal surfaces. Provided that the metal surfaces are sufficiently clean, a good metallurgical bond will be formed by diffusion at temperatures below the melting points of the metals and in the absence of a lower melting alloy. The gaseous hydrazine flux of the present invention may conveniently be employed to remove tarnish films from the metal surfaces in the solid state diffusion bonding process to permit the metal surfaces to diffuse into one another and form a good metallurgical bond.

The present invention provides a method for joining metal surfaces in which temperatures considerably lower than those employed with many conventional gaseous fluxes can be used. Since the reaction products from the present fluxing operation are typically nitrogen and water, a fluxing method is provided in which no contaminating, nonvolatile reaction products are formed. When conventional solid, paste and liquid fluxes are employed residues frequently remain on and contaminate the joined metal surfaces. Additionally, the use of a gaseous hydrazine flux avoids the corrosivity exhibited by other gaseous fluxes such as dry hydrogen chloride or nitrogen trifluoride, the corrosivity of which can lead to metallurgically imperfect metal bonds.

The following non-limitive examples illustrate the invention:

EXAMPLE 1

A printed copper circuit on a conventional printed circuit board which was pretinned with a solder composed of 50 percent tin and 50 percent lead and the gold leads of a conventional integrated circuit pack were cleaned with trichloroethylene and methanol. The leads of the integrated circuit pack were placed in physical contact with the pretinned printed copper circuit and the assembly was placed in an air-tight, glass-lined furnace which was heated to approximately 450° F. The leads of the integrated circuit pack formed a good metallurgical bond with the printed copper circuit after being exposed to a hydrazine-containing gas for five minutes. The hydrazine-containing gas was generated by passing a nitrogen carrier gas at a flow rate of 150 cc/min through aqueous hydrazine (40 percent) solution.

EXAMPLE 2

A printed copper circuit on a conventional printed circuit board, a copper wire and a solder washer composed of 63 percent tin and 37 percent lead were cleaned with trichloroethylene and methanol. The copper wire was soldered as described in Example 1 to the printed copper circuit in the presence of hydrazine-containing gas at 450° F using the solder washer. The hydrazine was supplied to the workpiece in the manner specified in Example 1. The copper wire formed a good metallurgical bond with the printed copper circuit.

EXAMPLE 3

A printed copper circuit on a conventional printed circuit board was cleaned with acetone. The printed copper circuit was pretinned with a solder composed of 50 percent tin and 50 percent lead. The printed circuit board was placed in an air-tight, glass-lined furnace and heated to approximately 525° F for 30 minutes in the presence of hydrazine-containing gas. The solder of the printed copper circuit reflowed and metallurgically bonded to the copper base metal. The hydrazine was supplied to the furnace by bubbling dry nitrogen gas at a flowrate of about 180 cc/min through liquid hydrazine heated to a temperature of about 100° F to supply approximately a 5 percent by volume hydrazine — 95 percent by volume nitrogen gas stream.

We claim:

1. In a method of joining metal surfaces with a solder alloy by soldering, the improvement comprising conducting said soldering in the presence of a gaseous flux consisting of hydrazine of the formula $R_1R_2NNHR_3$ wherein $R_1$, $R_2$ and $R_3$ are each hydrogen, aliphatic, cycloaliphatic or aromatic.

2. The method of claim 1 in which $R_1$, $R_2$ and $R_3$ are each hydrogen, alkyl, cycloparaffin or phenyl.

3. The method of claim 1 in which $R_1$, $R_2$ and $R_3$ are each hydrogen or alkyl of one to five C atoms.

4. The method of claim 1 in which $R_1$, $R_2$ and $R_3$ are each hydrogen.

5. The method of claim 1 in which the soldering is conducted at a temperature between about 350° and 525° F.

6. The method of claim 1 in which the metal surfaces are each gold, copper, nickel or silver.

7. The method of claim 1 in which the solder alloy is a soft solder.

8. The method of claim 1 in which the solder alloy is composed of tin and lead.

9. In the method of remelting a solder alloy deposit on a metal surface to reflow the solder alloy and metallurgically bond the solder alloy to the metal surface, the improvement comprising conducting said remelting and reflowing of said solder alloy in the presence of a flux which consists of gaseous hydrazine of the formula $R_1R_2NNHR_3$ wherein $R_1$, $R_2$ and $R_3$ are each hydrogen, aliphatic, cycloaliphatic or aromatic.

10. The method of claim 1 in which $R_1$, $R_2$ and $R_3$ are each hydrogen.

11. In a method of joining metal surfaces in which a flux is employed to remove tarnish films from the metal surfaces to permit the metal surfaces to form a good metallurgical bond, the improvement in which the flux consists of gaseous hydrazine of the formula $R_1R_2NNHR_3$ wherein $R_1$, $R_2$ and $R_3$ are each hydrogen, aliphatic, cycloaliphatic or aromatic.

12. The method of claim 11 in which $R_1$, $R_2$ and $R_3$ are each hydrogen.

13. The method of claim 11 in which the metal surfaces are joined by solid state diffusion bonding.

14. The method of claim 11 in which the gaseous hydrazine flux is in admixture with an inert gas.

15. The method of claim 14 in which the hydrazine concentration in the hydrazine flux - inert gas mixture is about 1 to 10 percent by volume.

16. The method of claim 14 in which the inert gas is nitrogen.

* * * * *